United States Patent
Blessing et al.

(10) Patent No.: US 7,090,309 B2
(45) Date of Patent: Aug. 15, 2006

(54) VARIABLE WALL THICKNESS TRAILER AXLES

(75) Inventors: Martin Blessing, Fort Wayne, IN (US); Kent Davison, Sturgis, MI (US)

(73) Assignee: Dana Corporation, Toledo, OH (US)

( * ) Notice: Subject to any disclaimer, the term of this patent is extended or adjusted under 35 U.S.C. 154(b) by 29 days.

(21) Appl. No.: 10/721,597

(22) Filed: Nov. 25, 2003

(65) Prior Publication Data

US 2005/0110336 A1    May 26, 2005

(51) Int. Cl.
*B60B 35/00* (2006.01)
*B60B 37/00* (2006.01)

(52) U.S. Cl. .................................. 301/124.1; 301/131

(58) Field of Classification Search ............. 301/124.1, 301/125, 129, 131, 132; 72/260; 74/607
See application file for complete search history.

(56) References Cited

U.S. PATENT DOCUMENTS

| | | | |
|---|---|---|---|
| 1,010,004 A * | 11/1911 | Wales | 72/355.6 |
| 1,823,158 A * | 9/1931 | Spatta et al. | 301/124.1 |
| 1,873,453 A * | 8/1932 | Spatta et al. | 228/155 |
| 2,133,091 A * | 10/1938 | Gettig | 301/124.1 |
| 2,611,656 A | 9/1952 | Vanderberg | |
| 3,037,818 A * | 6/1962 | Scheel | 301/124.1 |
| 3,668,918 A | 6/1972 | Benteler et al. | |
| 4,292,831 A | 10/1981 | Simon | |
| 4,768,839 A | 9/1988 | Spindler | |
| 4,787,680 A | 11/1988 | Bonjean et al. | |
| 5,259,268 A * | 11/1993 | Ebbinghaus et al. | 74/567 |
| 5,303,985 A | 4/1994 | Barnholt et al. | |
| 5,522,246 A | 6/1996 | Simon | |
| 5,996,981 A | 12/1999 | Dilling | |
| 6,439,672 B1 * | 8/2002 | Simon | 301/124.1 |
| 6,779,375 B1 * | 8/2004 | Alexoff | 72/370.02 |
| 6,807,837 B1 * | 10/2004 | Alexoff | 72/276 |

\* cited by examiner

*Primary Examiner*—Jason R Bellinger
(74) *Attorney, Agent, or Firm*—Dykema Gossett PLLC

(57) ABSTRACT

An axle assembly is provided having a varying wall thickness resulting in an axle assembly that is lightweight yet has sufficient strength and stiffness. The axle assembly includes a tube disposed about a longitudinal axis and having first and second end portions and a center portion. The first and second end portions have a uniform wall thickness and the center portion has a wall thickness that is uniform at first and second axially spaced segments and a non-uniform wall thickness both between the axially spaced segments and between each of the axially spaced segments and the end portions.

10 Claims, 3 Drawing Sheets

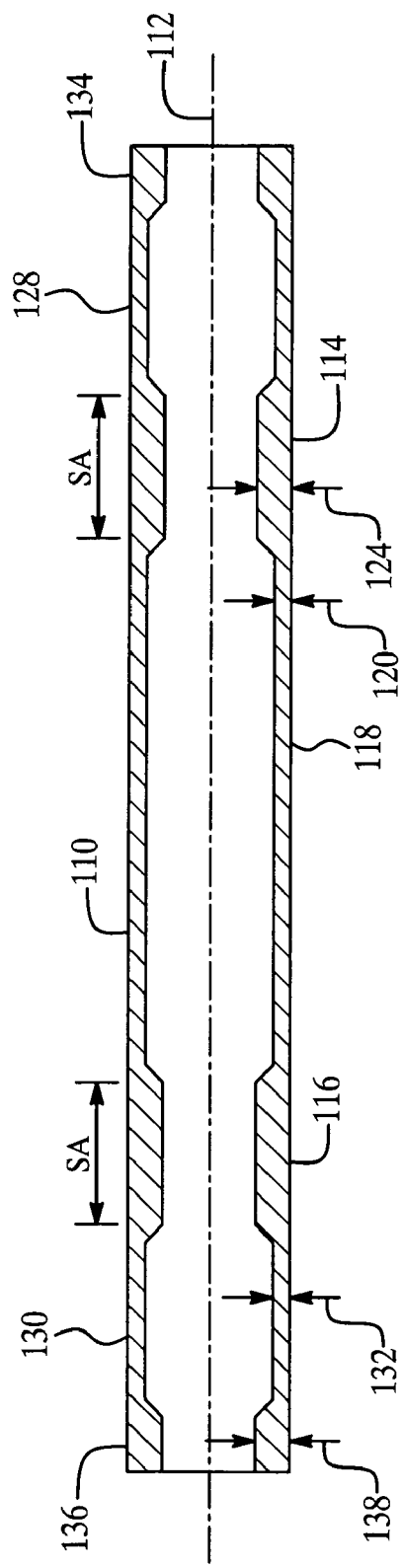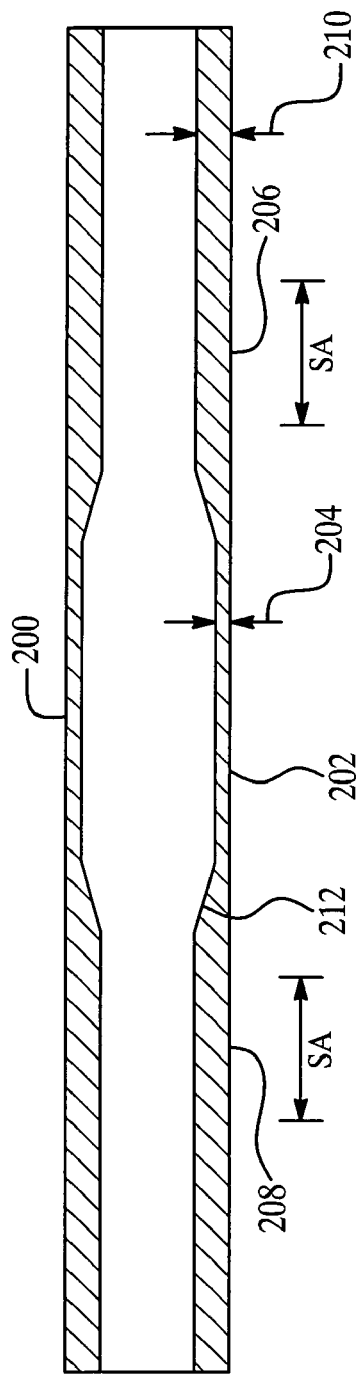

VARIABLE WALL THICKNESS TRAILER AXLES

BACKGROUND OF THE INVENTION

1. Field of the Invention

The field of the present invention is that of axle tubes and axle assemblies for trailer axles, especially trailer axles associated with large over the road trucking vehicles.

2. Discussion of Related Art

Many axle assemblies for truck trailers are fabricated from a tubular center member. At each extreme end of the tube, there is frictionally welded thereto, a spindle. The spindle provides a platform for rotatably mounting the vehicle wheel and associated rotary gear thereto. In a center portion of the axle tube outer diameter, there is typically welded thereto, brake brackets. The vehicle suspension brackets interact with the axle tube between the brake brackets.

There are two major technical challenges to be met in providing an axle assembly. First, the axle assembly must be strong and stiff enough to support the vehicle and withstand the various loading imposed upon it while maintaining proper wheel alignment. Second, the axle assembly must meet the strength and stiffness requirements, yet be as light as possible to maximize the load capacity of the vehicle.

SUMMARY OF THE INVENTION

To meet the above-noted and other challenges, a revelation of the present invention is brought forth. In one preferred embodiment, the present invention brings forth an axle assembly which includes a tube disposed about a longitudinal axis. The tube has first and second end portions and a center portion. The first and second end portions have uniform wall thickness. The center portion of the tube has a wall thickness that is uniform at first and second axially spaced segments. The center portion of the tube has a non-uniform wall thickness between the axially spaced segments and also between each of the axially spaced segments and the end portions of the tube.

The above-noted configurations of the tube allow the axle assembly to have very high strength and stiffness properties while having a thinner wall section where strength and stiffness is not required to provide for a lighter axle assembly.

Further embodiments and features of the present invention will become more apparent to those skilled in the art as the invention is further explained in the accompanying detailed description and drawings.

BRIEF DESCRIPTION OF THE DRAWINGS

FIG. 9 is a sectional view of an alternate preferred embodiment axle assembly according to the present invention.

FIG. 10 is a sectional view of still another alternate preferred embodiment axle assembly of the present invention.

DETAILED DESCRIPTION OF THE INVENTION

Figure 1:
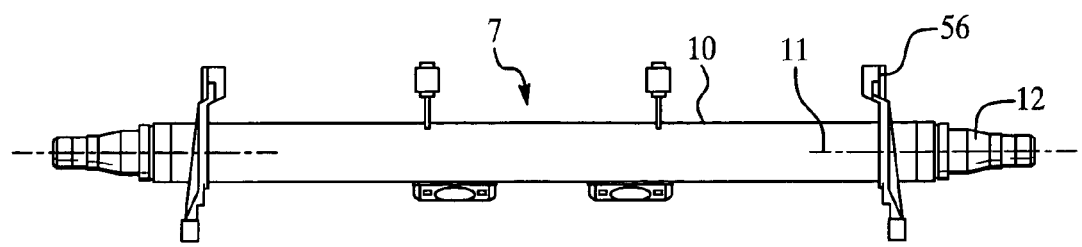
FIG. 1 is a perspective view of an axle assembly according to the present invention.
Figure 2:
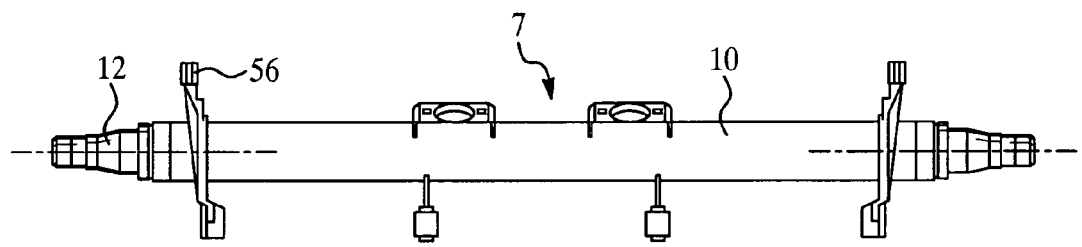
FIG. 2 is a view similar to that of FIG. 1 with the axle assembly being rotated about its axis 180 degrees from the position shown in FIG. 1.
Figure 3:
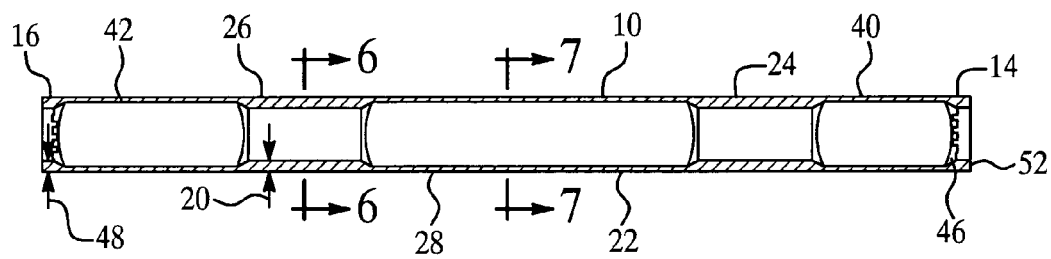
FIG. 3 is a sectional view of the axle assembly of FIG. 1.
Figure 4:
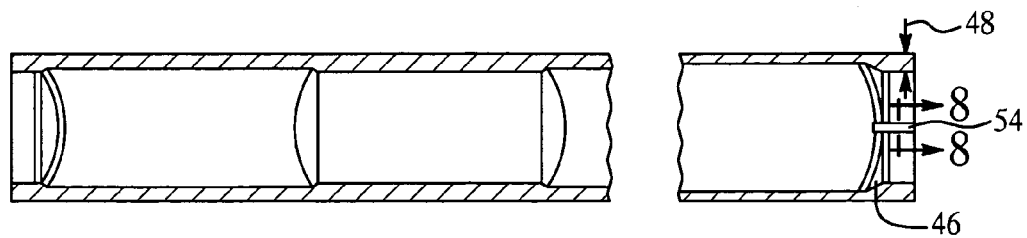
FIG. 4 is an enlargement of portions of FIG. 3.
Figure 5:
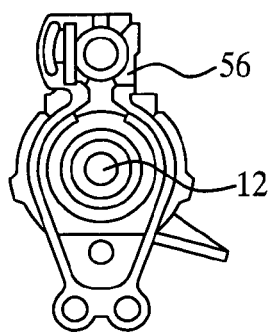
FIG. 5 is a side elevational view of the axle assembly shown in FIG. 1.

Referring to FIGS. 1–3, an axle assembly 7 is provided. The axle assembly 7 has an axle beam or assembly provided by a tubular member hereinafter referred to as tube 10. The tube 10 is disposed about a longitudinal axis 11. The tube 10 has adjoined to its opposite ends a spindle 12. The spindle 12 rotatably mounts the trailer wheels and other associated rotary hardware (not shown).

The tube 10 at its opposite extreme ends has first and second end portions 14, 16. The tube 10 has a uniform outer circular diameter. The first and second end portions have a uniform wall thickness 48. The tube 10 has a center portion 22 which extends between the two end portions 14, 16. The center portion 22 has first and second axially spaced segments 24, 26. The first and second axially spaced segments 24, 26 coincide with the portions of the assembly 7 which are connected with the trailer suspension (not shown).

Figure 6:
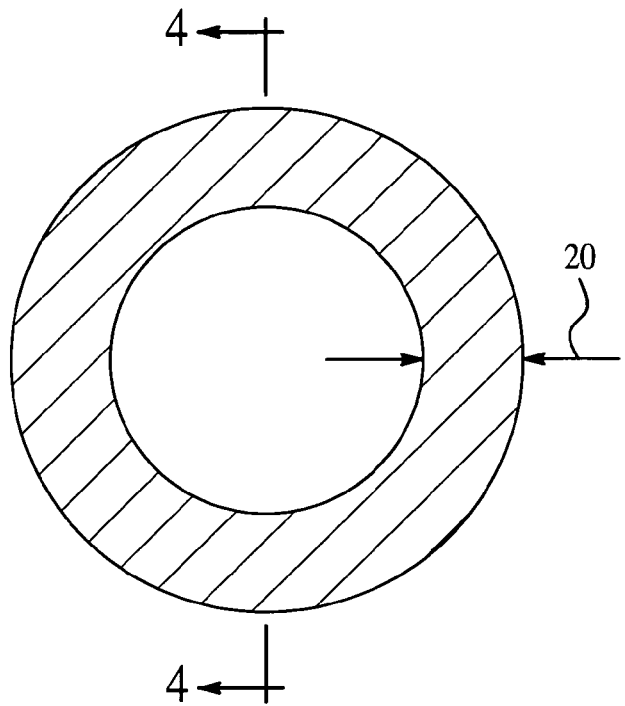
FIG. 6 is a view taken along line 6—6 of FIG. 3.
Figure 7:
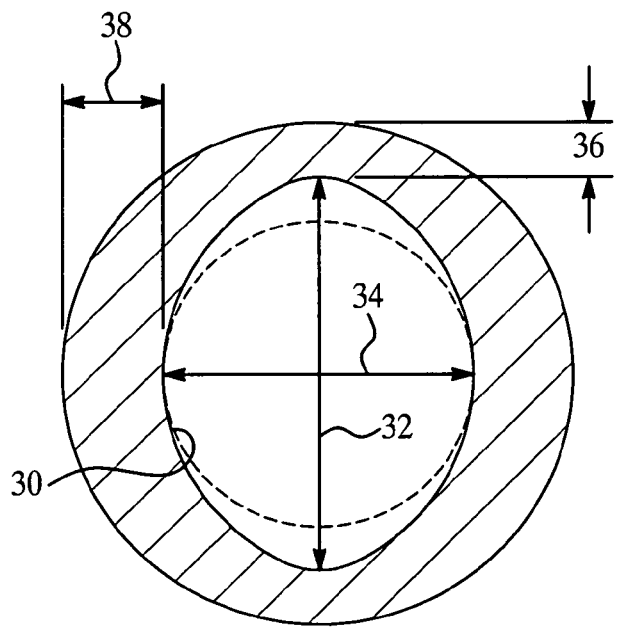
FIG. 7 is a view taken along line 7—7 of FIG. 3.
Figure 8:
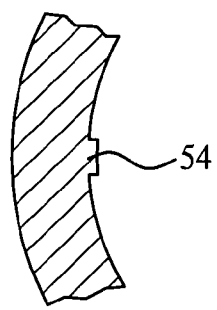
FIG. 8 is a view taken along line 8—8 of FIG. 4.

Referring additionally to FIGS. 6–7, between the axially spaced segments 24, 26 is a middle portion 28. The middle portion 28 has a non-uniform interior contour 30 which provides a generally elliptical shape. The elliptical interior contour has a major 32 and a minor dimension 34. The major dimension 32 has a minor wall thickness 36. The minor dimension 34 is aligned with a major wall thickness 38.

A wall thickness 20 of the axially spaced segments 24, 26 is greater than the minor wall thickness 36. In most instances the uniform wall thickness 20 will be equal or greater than the major wall thickness 38, and is selected to optimize the strength of suspension system attachment welds made within segments 24, 26.

Referring back to FIG. 3, between the axially spaced segments 24, 26 and the respective adjacent tube end portions 14 and 16, the center portion 22 has third and fourth portions 40, 42 respectively. The third and fourth portions 40, 42 will typically have an interior diameter with the same elliptical cross-sectional shape as the middle portion 28 with similar wall thickness dimensions.

The wall thickness of the third and fourth portion has a transition area 46 to the end portions 14, 16. The wall thickness 48 of the end portion will typically match that of the wall thickness of the spindles 12 and it functions to provide a weld interface with the spindles 12, which abuts an end face 52 of the end portions 14, 16.

The tube 10 may also have an integrally formed orientation rib 54 to allow an assembly operator to know where the minor and major wall thicknesses 36, 38 are oriented for the third and fourth portions 40, 42 and for the center portion 22. In most instances the major wall thickness 38 will be oriented vertically from one another approximately 90 degrees from that shown in FIG. 7 so that resistance against bending in a vertical plane is maximized.

The external diameter of the tube 10 has weldably connected thereto at opposite ends brake brackets 56.

Referring to FIG. 9 an alternate preferred embodiment tube 110 is provided. The tube 110 has a constant circular outer diameter disposed about a longitudinal axis 112. The tube 110 has first and second portions 114, 116 defining suspension arm attachment points. The portions 114, 116 are juxtaposed by a center portion 118 having a circular inner diameter of reduced wall thickness 120 as compared with wall thickness 124 of the first and second portions. Tube 110 has third and fourth portions 128, 130 outboard of the respective first and second portions 114, 116. The wall thickness 124 is thicker than the uniform wall thickness 132 of the third and fourth portions 128, 130. The tube 110 also has fifth and sixth end portions 134, 136 having uniform wall thickness 138 which is thicker than wall thicknesses 120, 132.

Referring to FIG. 10 still another alternate preferred axle assembly tube 200 is provided. The tube 200 has a center portion 202 with a wall thickness 204. The tube 200 has first and second portions 206, 208 which define suspension arm attachment points. The first and second suspension arm attachment points share a common second wall thickness 210 which is greater than the first wall thickness 204. A transition area 212 between the first wall thickness 204 and the second wall thickness 210 is made inboard of the suspension arm attachment points.

The wall thicknesses 204, 210 can be made uniform or in other instances can be made non-uniform having the center portion 202 preferably with a generally elliptical inner diameter. By maintaining the heavy wall outboard of the first and second portions 206, 208 potential failures in use are likely to occur in the center portion 202 of the tube. This reduces the possibility of an outboard failure and loss of a wheel. Accordingly this feature is referred to as a fuse feature.

The present invention has been shown in various embodiments. However it will be apparent to those skilled in the art of the various modifications and changes which can be made to the present invention without departing from the spirit or scope of the invention as defined by the following claims.

The invention claimed is:

1. An axle assembly comprising:
a tube disposed about a longitudinal axis and having first and second end portions and a center portion;
wherein said first and second end portions have a uniform wall thickness and said center portion has a cross-sectional wall thickness that is uniform at first and second axially spaced segments and a non-uniform cross-sectional wall thickness both between the axially spaced segments and between each of the axially spaced segments and said tube end portions.

2. An axle assembly as described in claim 1, wherein said tube first and second end portions and center portion have a common outer diameter.

3. An axle assembly as described in claim 1, wherein said tube center portion between said first and second axially space segments has an generally elliptical cross-sectional interior contour.

4. An axle assembly as described in claim 3, wherein said wall thickness at said center portion axially spaced segments is greater than a minor wall thickness of said center portion between said axially spaced segments.

5. An axle assembly as described in claim 3, wherein said wall thickness at said center portion axially spaced segments is at least equal to a major wall thickness of said center portion between said axially spaced segments.

6. An axle assembly as described in claim 1, wherein said center portion between said first and second axially spaced segments and respective first and second end portions has an interior contour which is elliptical.

7. An axle assembly as described in claim 6, wherein said wall thickness at said center portion axially spaced segments is greater than a minor wall thickness of said center portion between said axially spaced segments and said tube end portions.

8. An axle assembly as described in claim 6, wherein said wall thickness at said center portion axially spaced segments is at least equal to a major wall thickness of said center portion between said axially spaced segments and said tube end portions.

9. An axle assembly as described in claim 2, where said center portion axially spaced segments provide points of suspension system attachment and said wall thickness of said center portion axially spaced segments is greater than said major wall thickness of said center portion.

10. An axle assembly, comprising:
a constant outer diameter tube having first and second end portions and a center portion;
wherein said first and second end portions have uniform wall thickness and said center portion has a cross-sectional wall thickness that is uniform at first and second axially spaced segments and a generally elliptical interior diameter with a non-uniform cross-sectional wall thickness between the axially spaced segments and between each of the axially spaced segments and said tube end portions.

* * * * *